May 28, 1957

A. M. MacFARLAND 2,794,060

LEAKPROOF DRY CELL

Filed March 29, 1954

INVENTOR.
ALLISON M. MacFARLAND
BY Bosworth, Sessions,
Herrstrom & Williams
ATTORNEYS

United States Patent Office 2,794,060
Patented May 28, 1957

2,794,060

LEAKPROOF DRY CELL

Allison M. MacFarland, Cleveland, Ohio, assignor, by mesne assignments, to P. R. Mallory & Co. Inc., Indianapolis, Ind., a corporation of Delaware Application March 29, 1954, Serial No. 419,160

16 Claims. (Cl. 136—133)

This invention relates to dry cells and more particularly to leakproof dry cells adapted for use in flashlights and for similar services.

It is well known that under various conditions of service, and particularly after they have become substantially exhausted, ordinary dry cells of the Leclanche type are subject to leakage of electrolyte and swelling. With ordinary dry cells leakage of the electrolyte may corrode or otherwise damage the casing of the flashlight or other device in which the cells are used, and the cells or the cardboard tubes in which they are enclosed may swell to such an extent as to make it impossible to remove them from the casing.

It is therefore a general object of the present invention to provide dry cells particularly adapted for use in flashlights, but also useful in other devices, that will be leakproof and swell-proof under all conditions ordinarily encountered in service. Other objects include the provision of leakproof cells that can be manufactured at reasonable cost; the provision of leakproof cells embodying means for preventing the development of excessively high pressure within the cells; the provision of leakproof cells embodying metal jackets and which can be used interchangeably with conventional cardboard-jacketed cells without short-circuiting the devices in which they are installed; and the provision of leakproof cells having superior shelf life and performance characteristics. A more specific object is the provision of soft plastic inner or primary seals for dry cells that are adapted to permit discharge of gas from the interior of the cells while at the same time preventing the discharge of liquid from the cells and preventing the ingress of air to the active components of the cells.

The foregoing and other objects of the invention are preferably accomplished by providing cells embodying the usual zinc cup anode and carbon cathode and in which a special soft, plastic inner seal is utilized preferably in combination with an expansion space and an outer seal to relieve gas pressure within the cell while substantially preventing the discharge of liquids therefrom. The outer seal embodies an external steel jacket that surrounds the zinc cup, retains an imperforate upper closure cap in place and holds a resilient sealing washer in engagement with the upper edge of the zinc cup. An absorbent paper liner between the steel jacket and the zinc cup retains any fluid that may be discharged past the sealing washer. The steel jacket restrains the cells against radial expansion and is provided with an insulating exterior coating, thus preventing short circuits in the flashlight or other device in which the cell is used, and making it unnecessary to insulate the steel jacket from the zinc cup anode.

Referring to the drawings.

Figure 1:
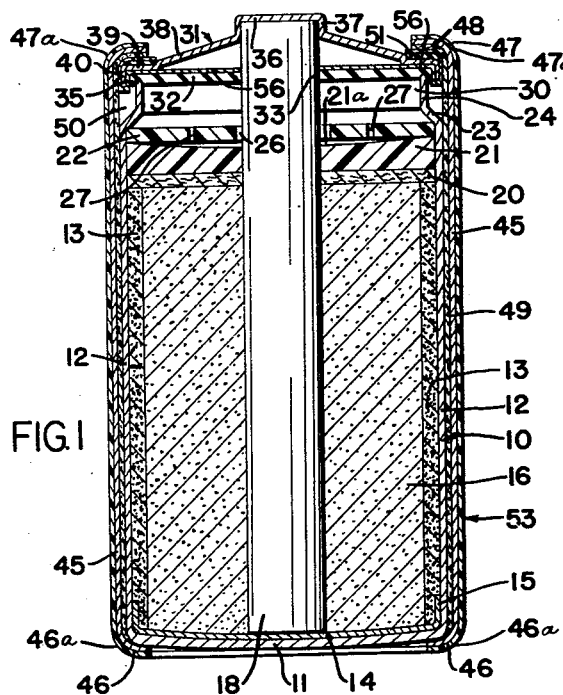
Figure 1 is a vertical cross-sectional view through a preferred form of cell made according to the invention.
Figure 2:
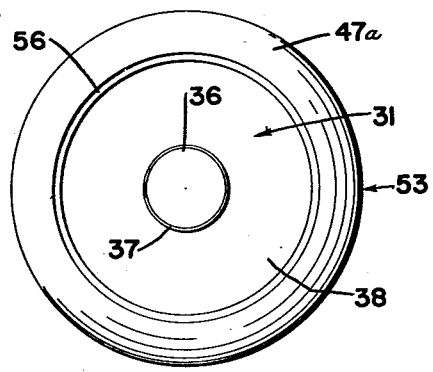
Figure 2 is a top plan view of the cell shown in Figure 1.

As shown in the drawings, a preferred form of cell embodying the invention comprises a conventional zinc cup electrode 10 constituting the anode of the cell, the cup preferably being extruded from a slug of zinc and having a bottom wall 11 which may be slightly thicker than the side wall 12. The cell illustrated is of the bag type and includes a layer of electrolyte paste 13 within the zinc anode cup 10, an insulating washer 14 overlying the bottom of the anode cup and extending upwardly slightly as at 15, a mass or bobbin of mix 16, and a carbon electrode or cathode 18 extending through the mass of mix 16 and substantially engaging the upper surface of the insulating washer 14. The carbon is of the usual type that is permeable to gases but not to liquids. These elements are conventional as will be understood by those skilled in the art.

During the operation of dry cells of this type, gases are evolved and the volume of liquid within the cells increases as a result of the chemical reactions that take place both before the cells are placed in service and during periods of activity and inactivity after they have been placed in service. As noted above, in the cell of the present invention, an inner seal and an outer seal are utilized to permit the discharge of gases under reasonable pressures of the order of a few pounds, and thus prevent building up of excessive pressure within the cell, while substantially preventing the discharge of liquids and excluding air from the interior of the cells.

The inner seal is supported by the paper washer 20 disposed immediately above the mix cake 16 and the upper edge of the electrolyte paste 13, the paper washer substantially filling the annular space between the carbon electrode 18 and the zinc cup 10. The seal itself comprises a layer 21 of soft plastic material which is thinner than the wax seal conventionally used in dry cells, being only about ⅛ inch thick in a preferred form of size D cell. The seal is poured on the top surface of washer 20, and is preferably composed of a suitable pitch, wax or other similar material which has the characteristics of adhering firmly to both the zinc container 10 and the carbon electrode 18, of being pourable at a reasonable temperature and of remaining sufficiently plastic under usual temperature conditions so that gases under pressure can pass through it in the form of small bubbles and so that it can be extruded gradually through small orifices under the influence of pressures developed within the cell without fracturing and without having its sealing engagement with the zinc and carbon destroyed. The term "soft plastic seal" as hereinafter employed is intended to mean a seal meeting these requirements. A seal composed of an asphaltic or bituminous composition and having the following characteristics as determined by standard A. S. T. M. testing procedures is satisfactory:

Softening point (A. S. T. M. test No. D–36) 173° F.
Penetration at 77° F. (A. S. T. M. test No. D–5) 29 cm.
Ductility at 77° F. (A. S. T. M. test No. D–113) 3.9 cm.
Stormer Viscosity (100 grams wt. 100 R. P. M.)
    19 seconds at 350° F.
    31 seconds at 320° F.
    46 seconds at 300° F.

A material sold as "Bi-wax" No. B-1128 by the Bi-wax Corporation of Skokie, Illinois, meets these requirements. Various other materials may be employed and the characteristics set forth above can be varied within reasonable limits without greatly affecting the results.

Above the seal 21 there is a rigid insulating washer 22 which may be composed of a phenol-formaldehyde resin or other suitable material. Washer 22 is disposed immediately above the top of the soft wax seal 21 which ordinarily has a slightly concave upper surface or meniscus resulting from shrinkage on cooling; accordingly the washer in most instances engages the outer marginal portion of the seal 21 and is spaced therefrom at the inner portion 21a. The washer is retained against upward movement by the inwardly extending shoulder 23 of the side wall 12 of zinc can 10, the upper portion of the side wall terminating in a short cylindrical portion 24 of reduced diameter.

It will be noted that there may be a slight (for example 1/16 inch in a preferred form of size D cell) clearance space 26 between the washer 22 and the carbon electrode 18. Also, or alternatively, the washer may be provided with small (for example 1/16 inch to 1/8 inch in a preferred form of size D cell) apertures 27 therethrough. With such constructions, pressure developed in the active material of the cell by the generation of gas at a rate faster than it can be discharged through the porous carbon, production of additional quantities of liquid, or increase in volume of the constituents of the cell due to the chemical reactions results in the application of pressure to the soft seal 21. When the pressure so applied becomes sufficiently great, the material of the seal, if it is not already in contact with the washer 22, first moves upwardly into engagement with the under surface of the washer 22, then if the pressure remains sufficiently great, some of the material of the seal 21 is extruded through the orifices provided by clearance space 26 or the orifices 27 or either or both in the form of a thin ribbon, filament, or the like into an expansion space 30, which is defined by the washer 22 and the top closure 31. Changes in the sizes of the orifices through which the material is extruded change the pressures required for extrusion, the smaller the orifices, the greater the required pressure and vice versa. The extrusion relieves the pressure before it becomes excessively high, yet the residual pressure and the presence of the soft wax seal prevent oxygen of the air from having access to the active materials of the cell. Furthermore, the extrusion of a portion of the material of the seal through the relatively small orifices provided by the clearance space 26 or openings 27 apparently permits gases to bubble through or otherwise pass the soft plastic seal and thence flow out through the orifices and into the expansion space 30, while liquid materials such as electrolyte are in large part retained by the seal and prevented from reaching the expansion space. Thus the inner seal, as it relieves pressure within the active components of the cell, acts as a gas and liquid separator and substantially prevents the loss of liquid from the cell.

While an inner seal of the type described can be utilized with various cell constructions other than the preferred form disclosed herein, it is desirable to provide an expansion space such as the space 30 immediately above the washer 22 for the reason that the expansion space 30 gives an additional opportunity for the separation of the liquid and gaseous constituents that are forced out of the cell. This space is adequate to receive all of the sealing material that may be extruded through the openings in the washer 22 and also retains substantially all of the liquid, if any, that may be carried along with the extruded sealing material. It is to be noted that the expansion space is at all times separated from the active components of the cell by the inner seal; hence the cell is never subjected to the deleterious influence of the oxygen in the air within the expansion space. It is also to be noted that, because of the comparatively small volume of the inner seal, due to its thinness, the expansion space can be of substantial volume.

In order to permit gas to escape from the expansion space while substantially preventing the discharge of liquid therefrom, I preferably employ an outer seal or vent comprising a resilient washer 32 of rubber or similar material having a central opening 33 closely fitting carbon electrode 18 in order to center the washer. The seal is produced by clamping the washer, near its outer periphery, between the upper edge 35 of the reduced portion 24 of the zinc can 10 and the closure cap 31. Cap 31 is imperforate, constitutes the terminal for the carbon electrode 18 as well as the top closure of the cell, and has a contact portion 36 engaging the upper end of the carbon electrode 18 and adapted to make contact with an external circuit, a cylindrical portion 37 substantially fitting the upper cylindrical end of the carbon electrode, a conical portion 38, a flat peripheral portion 39 and a depending flange 40. The flat peripheral portion 39 engages the upper peripheral marginal surface of the washer 32 while the depending flange surrounds the periphery of the washer 32.

In order to create a seal between the cap 31, the washer 32 and the upper edge 35 of the zinc can 10, as well as to provide an enclosure for the entire cell, the washer 32 is compressed between the flat peripheral portion 39 and the upstanding edge 35 by means of an open-ended cylindrical jacket 45 preferably composed of thin steel; prior to assembly, the lower end 46 of the jacket is turned inwardly as shown to lie under and engage the bottom of the zinc can 10, and after assembly with the remaining components of the cell the upper edge of the jacket is rolled or spun inwardly as at 47 to exert the required pressure on the washer 32, the pressure being transmitted through the upper portion 48 of liner 49 which extends between the zinc can and the jacket 45, and through insulating washer 51.

With this arrangement, the degree of compression of the sealing washer 32 between the edge 35 of the can 10 and the flat surface 39 of the cap 31 can be controlled by controlling the amount that the upper edge 47 is turned in. Preferably, only a light force is exerted by the turned-in portion and only a slight pressure within the expansion space 30 is required to permit the discharge of gas from the expansion space 30 into the annular space 50 surrounding the reduced portion 24 of the zinc can 10 and within the upper portion of the steel jacket 45 and liner 49; i. e., the outer seal in a preferred form of the invention acts primarily as a vent; however, if desired the upper edge of the jacket can be turned in a greater amount so that a pressure of several pounds will be required before gas is discharged past the outer seal.

As noted above, the inner seal largely prevents the discharge of liquid into the expansion chamber 30. Further separation of liquid and gas takes place in the expansion chamber 30, and the outer seal provided by washer 32 also functions to permit gas to escape while holding back liquid. Under most circumstances, therefore, only gas is discharged into the annular space 50. However, if any liquid should be discharged into the space 50, it will be retained by the absorbent liner 49 while gases discharged past the outer seal diffuse readily through the liner and find their way to the exterior either through the seam 52 in the jacket 45 if an ordinary lock seamed can without solder is employed, or at the lower end of the cell where the inwardly turned portion 46 of the jacket engages the bottom 11 of can 10 but is not sealed thereto. In order to prevent electrolyte that has reached the liner 49 from being carried by capillary attraction to points where it could reach the exterior, the liner is preferably impregnated with zinc oxide, which functions to solidify and immobilize the electrolyte reaching the liner and thus prevents oozing of electrolyte either at the top or bottom of the cell.

Thus the inner seal provided by the seal 21, the expansion chamber 30, the outer seal provided by the washer 32, the absorbent paper liner 49, and steel jacket 45 all function cooperatively to prevent the escape of liquid from the cell while permitting the escape of gases before excessive pressures are developed within the cell. Inasmuch as internal pressures are held to reasonable levels, serious difficulties do not occur even if the wall 12 of the zinc can 10 is perforated by action of the electrolyte. Most of the increase in volume of the components of the cell is taken care of by the extrusion of the soft wax seal 21 and by the expansion space 30 so that if perforation of the wall 12 does take place the electrolyte is not forced to the exterior under great pressure, but rather seems to exude slowly through the perforations and is absorbed and retained by the absorbent liner 49. Furthermore, I have found that the operation of cells of this type under reasonable pressures, such as the pressure retained by the inner seal of the present invention, apparently results in a thickening of the exudate, which makes it easier to handle and retain.

Corrosion of the interior of the bottom 11 of the can is substantially prevented by the washer 14, and the bottom is thick enough to retain the contents of the can against any pressure that may be developed therein. Accordingly, the bottom 11 is not covered or enclosed in any way, and constitutes the terminal for the zinc element of the cell.

Inasmuch as cells of the general type described herein are used in flashlights, radios and other devices where a bare steel jacket might cause short circuits, and inasmuch as the steel jacket 45 is in circuit with the zinc can, the turned-in portion 46 making contact with the bottom 11, it is necessary to insulate the exterior of the jacket 45. This is accomplished by means of a coating or layer 53 on the exterior of the jacket composed of a suitable insulating plastic or the like, such as cellulose acetate butyrate which can be formed into a tube the same length as the steel jacket to fit snugly thereon. Prior to insulating the steel jacket, it may be printed with suitable indicia and decorations to provide a label for the cell. Preferably, the printing operations are carried out while the steel is in flat sheet form; thereafter, the sheets are slit and formed into tubular form and the end 46 turned in by means of can-making machinery. The steel can be ordinary so-called "black" plate, it being unnecessary to employ terne plate or the like, and it is possible to employ an absorbent paper liner 49 rather than an electrolyte-proof liner as required in some cells.

Figure 3:
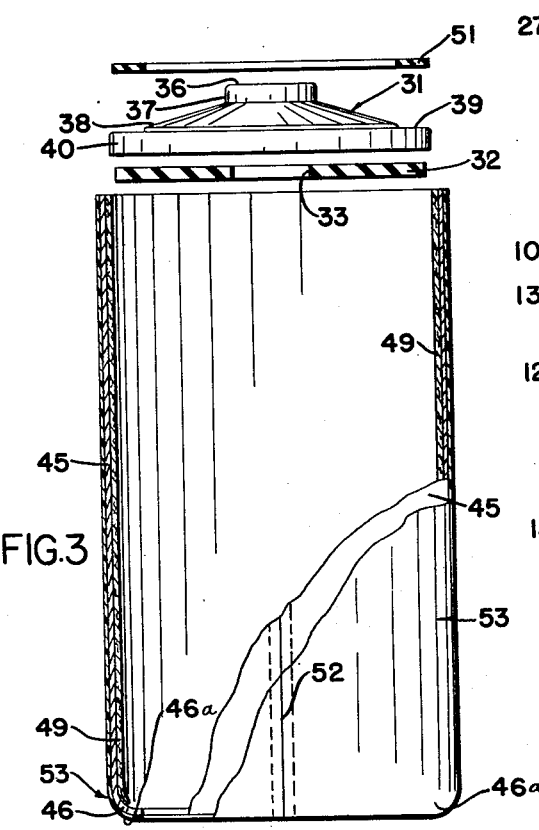
Figure 3 is a view, partly in section, showing the steel jacket, liner and other elements which go to make up the external enclosure for the cell.
Figure 4:
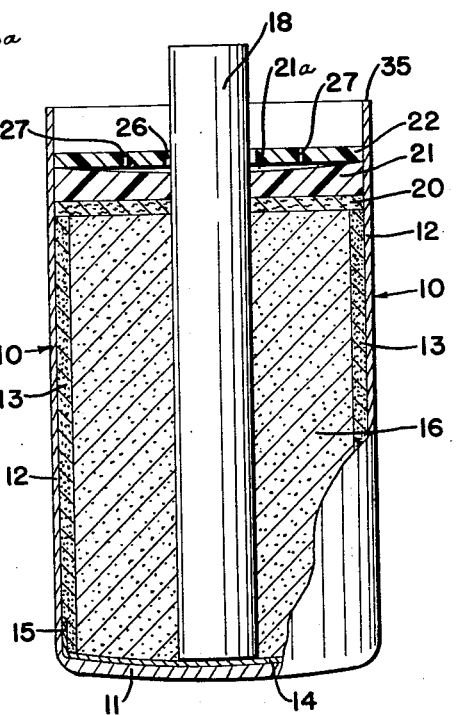
Figure 4 is a vertical sectional view showing the active elements of the cell at one stage of manufacture.

Component parts and steps in the manufacture of a cell embodying the invention are illustrated in Figures 3 and 4. As shown in Figure 4, the active cell elements may be assembled in the usual manner, that is, the washer 14, paste 13, mix bobbin 16 and carbon electrode 18 may be placed within the zinc can 10 in the conventional manner. The paper washer 20 is then disposed above the bobbin and the soft inner seal 21 is poured over the washer 20, the sealing material being at an elevated temperature. Next the rigid washer 22 is positioned on the upper surface of the seal 21. These operations are carried out while the zinc cup 10 is substantially cylindrical throughout, as shown in Figure 4. Thereafter, the upper end of the zinc can is necked in, preferably by means of a die, to provide the inwardly extending shoulder 23 and the reduced portion 24 shown in Figure 1, the shoulder 23 functioning to retain the washer 22 in position.

The active elements of the cell, including the inner seal and having the appearance shown in Figure 4 except that the upper end of the zinc can is necked in, are then inserted within the steel jacket 45 which previously has been supplied with the absorbent liner 49. Prior to assembly the bottom end of the steel jacket 45 has been deformed inwardly as indicated at 46, this operation ordinarily being performed by the can-making machinery utilized to form the jackets. The inwardly turned portion 46 positions the liner 49, retains the zinc cup within the jacket, and makes electrical contact therewith.

After the cell elements have been placed within the jacket, the resilient sealing washer 32 is placed over the carbon electrode and disposed with its marginal edge overlying the upper marginal edge 35 of the reduced portion 24 of the can 10. Next, the closure cap 31 is positioned on the carbon electrode with its flat peripheral portion 39 engaging the upper surface of the resilient washer 32 opposite the edge 35 of the can and with its flange 40 surrounding the peripheral edge of the washer 32. Insulating washer 51 is then placed on the upper side of the flat portion 39 of the cap 36 and the seal is completed by crimping, spinning, rolling, or otherwise deforming the upper edge of the zinc container inwardly into the form shown at 47 in Figure 1. This operation bends the absorbent liner 49 over the washer 51 as shown and the crimping operation also forces the cap 31 toward the upper edge of the zinc can 10, thus compressing the resilient washer 32 between the edge 35 and the flat portion 39 of the cap 31. In this manner, the outer seal is completed, the amount of crimping or deformation of the upper edge 47 of outer sleeve 45 being controlled to permit ready venting of gas from within the expansion space 30. After this final crimping operation, the plastic tube 53 is slipped over the steel jacket, the ends of which will extend beyond the cell since the steel jacket has been crimped on both ends, as at 46 and 47. However, the properties of cellulose acetate butyrate are such that appropriate heating will cause the free ends 46a and 47a to shrink onto and assume the shape of ends 46 and 47, respectively, of the steel jacket 45.

Short circuiting between the upper portion of the zinc can 10 and the cap 31 by electrolyte that may find its way into the annular space 50 may be prevented by suitably placed insulation. This is accomplished with the employment of a layer of "Saran" ("Saran" is a trade mark for polyvinyl chloride sheet material manufactured by Dow Chemical Company) or other similar plastic 56 which is placed on the top of washer 32 to engage the lower surface of the flat peripheral portion 39 of cap 31, and to wrap around edge 40 of cap 31 and then extend upwardly to cover the top surface of washer 51. This Saran insulation 56, as shown in Figure 1, seals the path that must be bridged by electrolyte between the can and the cap to create a short circuit. For some types of cells this insulation is not necessary, but for others in which liquid electrolyte may be exuded into the annular space 50 it is of substantial advantage.

Cells made according to the invention are leakproof under all conditions ordinarily encountered in storage, transportation or service. They have excellent performance characteristics because the thinness of the inner seal makes possible the use of adequate quantities of active material while at the same time permitting the expansion space 30 to be of ample volume. Deterioration during shelf life and inactive periods is minimized by the inner seal 21 which is disposed immediately above the mix cake with only the washer 20 intervening and which prevents loss of moisture from the cell and protects the active components of the cell from the atmosphere. Discharge of gas to the exterior is permitted while liquid is retained; this is accomplished by (1) the inner seal, which permits discharge of gas after a pressure of, for example, a few pounds per square inch, (2) the expansion chamber, (3) the outer seal, and (4) the absorbent line 49 which immobilizes any electrolyte that may reach it while permitting gas to be discharged.

The washer 14 prevents perforation of the bottom 11 of the zinc can and if perforations should take place elsewhere through the side walls of the can, any electrolyte leaking therethrough is absorbed and immobilized by the absorbent liner 49. Swelling of the cell or the absorbent liner is prevented by the steel jacket 45. Inasmuch as the steel jacket 45 is provided with effective insulation on the exterior thereof, cells embodying the invention can be used in substitution for conventional cardboard covered cells without fear that the steel jackets will create short circuits within the flashlights or other devices with which they are used. Because of the insulation of the exterior of the steel jackets, it is unnecessary to insulate the jacket from the zinc, and hence an inexpensive absorbent liner can be employed.

It is to be understood that changes and modifications may be made in the preferred form of the invention disclosed herein without departing from the spirit and scope of the invention.

I claim:

1. A dry cell comprising a zinc cup constituting an electrode, a mass of mix and a central gas-permeable carbon electrode within said cup, a washer disposed immediately above said mass of mix, a soft plastic inner seal engaging said washer, said carbon electrode and the inner wall of said cup, a rigid washer above the upper surface of said inner seal, and having an orifice through which the material of said inner seal is extrudable under pressure, said rigid washer extending from said carbon electrode to the inner surface of said cup, said cup having a portion of reduced diameter above said rigid washer providing a shoulder for preventing upward movement of said rigid washer under the influence of pressure within the cell, an imperforate metal closure cap for the top of the cell, said cap engaging said carbon electrode and providing a terminal therefor and having a peripheral portion overlying the upper edge of the reduced portion of said cup, there being an expansion space within said cup between said cap and said rigid washer, a resilient sealing washer having its central portions engaging said carbon electrode and its peripheral portion disposed between said edge and said peripheral portion of said cap, an open ended outer steel jacket surrounding said zinc cup, the lower edge of said jacket being turned inwardly to engage and make electrical contact with the bottom of the zinc cup, an absorbent paper liner within said jacket and surrounding the side wall of said cup, said liner being spaced from the side wall of said cup adjacent said reduced portion thereof, the upper edge of said jacket being turned inwardly to urge said cap toward said edge of said zinc cup and to compress said sealing washer between said edge and said cap, there being insulation between said cap and said jacket.

2. A cell according to claim 1 wherein said absorbent liner is impregnated with zinc oxide.

3. A dry cell comprising a zinc cup constituting an electrode, a mass of mix and a central carbon electrode within said cup, a washer disposed immediately above the mass of mix, a soft plastic inner seal above said washer, a rigid washer engaging at least a portion of the upper surface of said inner seal and having an orifice through which the material of said inner seal is extrudable under pressure, said rigid washer extending from adjacent said carbon electrode to the inner surface of said cup, said cup having a portion of reduced diameter above said rigid washer providing a shoulder for preventing upward movement of said rigid washer under the influence of pressure within the cell, an imperforate closure cap for the top of the cell, said cap engaging said carbon electrode and providing a terminal therefor and having a peripheral portion overlying the upper edge of the reduced portion of said cup, there being an expansion space within said cup between said cap and said rigid washer, a resilient sealing washer disposed between said edge and said peripheral portion of said cap, an open-ended outer steel jacket surrounding said zinc cup, the lower edge of said jacket being turned inwardly to engage and make electrical contact with the bottom of the zinc cup, an absorbent liner within said jacket and surrounding the side wall of said cup, the upper edge of said jacket being turned inwardly to urge said cap toward said edge of said zinc can and to compress said sealing washer between said edge and said cap, there being insulation between said cap and said jacket.

4. A dry cell comprising a cup constituting an electrode, a mass of mix and a central electrode within the cup, a soft plastic inner seal above the mass of mix, a rigid washer above the upper surface of said inner seal and having an orifice through which the material of said inner seal is extrudable under pressure, said rigid washer extending from said central electrode to the inner surface of said cup, means for preventing upward movement of said rigid washer under the influence of pressure within the cell, an imperforate closure cap for the top of the cell, said cap engaging said central electrode and providing a terminal therefor and having a peripheral portion overlying the upper edge of said cup, there being an expansion space within said cup between said cap and said rigid washer, a resilient sealing washer disposed between said edge and said peripheral portion of said cap, an open ended jacket surrounding said cup, the lower edge of said jacket being turned inwardly to engage the bottom of said cup, an absorbent paper liner within said jacket and surrounding the side wall of said cup, the upper edge of said jacket being turned inwardly to urge said cap toward said edge of said zinc can and to compress said sealing washer between said edge and said cap.

5. A dry cell comprising a zinc cup consituting an electrode, a mass of mix and a central gas-permeable carbon electrode within the cup, an inner seal permeable to gas under pressure immediately above said mass of mix, said cup having a portion of reduced diameter at the upper end thereof, an imperforate metal closure cap for the top of the cell, said cap engaging said carbon electrode and providing a terminal therefor and having a peripheral portion overlying the upper edge of said cup, there being an expansion space within said cup between said cap and said inner seal, a sealing washer having its central portion engaging said carbon electrode and its peripheral portion disposed between said edge and said peripheral portion of said cap, an open ended outer steel jacket surrounding said zinc cup, the lower edge of said jacket being turned inwardly to engage and make electrical contact with the bottom of the zinc cup, an absorbent paper liner within said jacket and surrounding the side wall of said cup, said liner being spaced from the side wall of said cup adjacent said portion of reduced diameter, the upper edge of said jacket being turned inwardly to urge said cap toward said edge of said zinc cup and to compress said sealing washer between said edge and said cap, there being insulation between said cap and said jacket.

6. A cell according to claim 5 wherein said absorbent liner is impregnated with zinc oxide.

7. A dry cell comprising a zinc cup constituting an electrode, a mass of mix and a central gas-permeable carbon electrode within the cup, an inner seal permeable to gas under pressure immediately above said mass of mix, an imperforate metal closure cap for the top of the cell, said cap engaging said carbon electrode and providing a terminal therefor and having a peripheral portion overlying the upper edge of said cup, there being an expansion space within said cup between said cap and said inner seal, a sealing washer having its central portion engaging said carbon electrode and its peripheral portion disposed between said edge and said peripheral portion of said cap, an open ended outer steel jacket surrounding said zinc cup, the lower edge of said jacket being turned inwardly to engage and make electrical contact with the bottom of the zinc cup, an absorbent paper liner within said jacket and surrounding the side wall of said cup, said liner being spaced from the side wall of said cup adjacent the upper end thereof, the upper edge of said jacket being turned inwardly to urge said cap toward said edge of said zinc cup and to compress said sealing washer between said edge and said cap, there being insulation between said cap and said jacket.

8. A dry cell comprising a cup constituting an electrode, a mass of mix and an electrode within the cup, an inner seal permeable to gas under pressure immediately above said mass of mix, an imperforate closure cap for the top of the cell, said cap having a peripheral portion overlying the upper edge of said cup, there being an expansion space within said cup between said cap and said inner seal, a resilient sealing washer having its peripheral portion disposed between said edge of said cup and said peripheral portion of said cap, an open ended jacket surrounding said cup, the lower edge of said jacket being turned inwardly to lie under the bottom of said cup, an absorbent paper liner within said jacket and surrounding the side wall of said cup, said liner being spaced from the side wall of said cup adjacent the upper end thereof, the upper edge of said jacket being turned inwardly to urge said cap toward said edge of said cup and to compress said sealing washer between said edge and said cap.

9. A dry cell comprising a cup, active cell elements including a carbon electrode within said cup, a soft plastic inner seal permeable to gas under pressure immediately above said active cell elements, and imperforate closure cap for the top of the cell having a peripheral portion overlying the upper edge of said cup, there being an expansion space within said cup between said cap and said inner seal, a resilient sealing washer having its central portion engaging said carbon electrode and its peripheral portion disposed between said edge and said peripheral portion of said cap, an open ended outer jacket surrounding said cup, the lower edge of said jacket being turned inwardly to lie under the bottom of said cup, an absorbent paper liner within said jacket and surrounding the side wall of said cup, the upper edge of said jacket being turned inwardly to urge said cap toward said edge of said zinc cup and to compress said sealing washer between said edge and said cap.

10. A dry cell comprising a zinc cup constituting an electrode, a mass of mix and a central gas-permeable carbon electrode within the cup, a soft plastic inner seal permeable to gas under pressure immediately above said mass of mix, an imperforate metal closure cap for the top of the cell, said cap engaging said carbon electrode and providing a terminal therefor, there being an expansion space within said cup between said cap and said inner seal, and means providing a seal adapted to vent gas from said expansion space.

11. A dry cell comprising a zinc cup constituting an electrode, a mass of mix and a central carbon electrode within the cup, a washer disposed immediately above said mass of mix, a soft plastic inner seal engaging said washer, said carbon electrode and the inner wall of said cup, a rigid washer above said inner seal and having an orifice through which the material of said seal is extrudable under pressure, said rigid washer extending from said carbon electrode to the inner surface of said cup, said cup having a portion of reduced diameter above said rigid washer providing a shoulder for preventing upward movement of said rigid washer under the influence of pressure within the cell, an imperforate metal closure cap for the top of the cell, said cap engaging said carbon electrode and providing a terminal therefor, there being an expansion space within said cup between said cap and said rigid washer, means for creating an outer seal between said cap and the upper edge of said cup, said outer seal being adapted to vent gas from the interior of said cell, and absorbent means surrounding said outer seal for absorbing any liquid that may pass said outer seal.

12. A dry cell comprising a zinc cup constituting an electrode, a mass of mix and a central carbon electrode within the cup, a soft plastic inner seal disposed above said mass of mix and engaging said carbon electrode and the inner wall of said cup, a rigid washer above said inner seal and having an orifice through which the material of said seal is extrudable under pressure, said rigid washer extending from said carbon electrode to the inner surface of said cup, means for preventing upward movement of said rigid washer under the influence of pressure within the cell, an imperforate closure cap for the top of the cell, said cap engaging said carbon electrode and providing a terminal therefor, there being an expansion space within said cup between said cap and said rigid washer, means for creating an outer seal between said cap and the upper edge of said cup, said outer seal being adapted to vent gas from the interior of said cell, absorbent means surrounding said outer seal for absorbing any liquid that may pass said outer seal, and an outer jacket composed of electrolyte-impervious material surrounding said absorbent means.

13. A dry cell comprising a zinc cup constituting an electrode, a mass of mix and a central carbon electrode within the cup, a washer disposed immediately above said mass of mix, a soft plastic inner seal engaging said washer, said carbon electrode and the inner wall of said cup, a rigid washer above said inner seal and having an orifice through which the material of said seal is extrudable under pressure, said rigid washer extending from said carbon electrode to the inner surface of said cup, means for preventing upward movement of said rigid washer under the influence of pressure within the cell, and closure means for the top of the cell, there being an expansion space within said cup between said closure means and said rigid washer.

14. A dry cell comprising a cup, active cell elements within said cup, a soft plastic inner seal disopsed above said active cell elements, means overlying the upper surface of said inner seal and limiting bodily upward movement thereof, said means having an orifice through which the material of said seal is extrudable under pressure, and a closure for the top of the cell, said closure being spaced from said means.

15. A dry cell comprising a cup, active elements within the cup, a soft plastic seal disopsed above said active cell elements and engaging the inner wall of said cup, a rigid washer disposed above the upper surface of said soft plastic seal and limiting bodily upward movement thereof, said washer having an orifice through which the material of said seal is extrudable under pressure.

16. A dry cell comprising a cup, active cell elements within said cup, a soft plastic inner seal permeable to gas under pressure immediately above said active cell elements, an imperforate closure cap for the top of the cell having a peripheral portion overlying the upper edge of said cup, a resilient sealing washer having its central portion adjacent said carbon electrode and its peripheral portion disposed between said edge and said peripheral portion of said cap, a layer of electrolyte-impervious, flexible, insulating material disposed between said peripheral portion of said cap and said resilient sealing washer and extending around the peripheral edge of said cap, an open ended outer jacket surrounding said cup, the lower edge of said jacket being turned inwardly to lie under the bottom of said cup, the upper edge of said jacket being turned inwardly to urge said cap toward said edge of said zinc cup and to compress said sealing washer between said edge and said cap.

References Cited in the file of this patent
UNITED STATES PATENTS

| | | |
|---|---|---|
| 2,243,938 | Anthony | June 3, 1941 |
| 2,307,763 | Deibel | Jan. 12, 1943 |
| 2,332,456 | McEachron et al. | Oct. 19, 1943 |
| 2,396,693 | Glover | Mar. 19, 1946 |